United States Patent
Jayaramachar et al.

(10) Patent No.: US 12,156,128 B2
(45) Date of Patent: Nov. 26, 2024

(54) METHODS, SYSTEMS, AND COMPUTER READABLE MEDIA FOR MANAGING NETWORK SLICE SELECTION ASSISTANCE INFORMATION (NSSAI) AVAILABILITY INFORMATION AT NETWORK SLICE ELECTION FUNCTION (NSSF)

(71) Applicant: Oracle International Corporation, Redwood Shores, CA (US)

(72) Inventors: Amarnath Jayaramachar, Bangalore (IN); Sairam Sudhir Pokkunuri, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 237 days.

(21) Appl. No.: 17/853,130

(22) Filed: Jun. 29, 2022

(65) Prior Publication Data
US 2024/0007938 A1    Jan. 4, 2024

(51) Int. Cl.
*H04W 48/18*     (2009.01)
*H04L 41/0895*    (2022.01)
*H04W 48/16*     (2009.01)

(52) U.S. Cl.
CPC ......... *H04W 48/18* (2013.01); *H04L 41/0895* (2022.05); *H04W 48/16* (2013.01)

(58) Field of Classification Search
None
See application file for complete search history.

(56) References Cited

U.S. PATENT DOCUMENTS

| | | | |
|---|---|---|---|
| 10,206,092 B1 * | 2/2019 | Mellquist | H04W 8/005 |
| 2018/0317163 A1 * | 11/2018 | Lee | H04W 4/70 |

OTHER PUBLICATIONS

"3rd Generation Partnership Project; Technical Specification Group Core Network and Terminals; 5G System; Network Slice Selection Services; Stage 3 (Release 17)," 3GPP TS 29.531, V17.4.0, pp. 1-80 (Mar. 2022).

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

\* cited by examiner

*Primary Examiner* — Alex Skripnikov
(74) *Attorney, Agent, or Firm* — Jenkins, Taylor & Hunt P.A.

(57) ABSTRACT

A method for managing NSSAI availability information at an NSSF includes receiving and storing NSSAI availability information from NF service consumers. The method further includes maintaining time values usable to determine expiration times for NSSAI availability information database records, where the time values are updated when a corresponding record is updated. The method further includes auditing the records, and, in response to failing to receive a request to update the NSSAI availability information for one of the NSSAI information database records within an expiration time, marking the record as stale. When a trigger is detected for providing NSSAI availability information from one of the database records that is marked as stale, the NSSF refrains from providing the NSSAI availability information to the NF service consumer.

20 Claims, 10 Drawing Sheets

METHODS, SYSTEMS, AND COMPUTER READABLE MEDIA FOR MANAGING NETWORK SLICE SELECTION ASSISTANCE INFORMATION (NSSAI) AVAILABILITY INFORMATION AT NETWORK SLICE ELECTION FUNCTION (NSSF)

TECHNICAL FIELD

The subject matter described herein relates to managing network slice related information at an NSSF. More particularly, the subject matter described herein relates to methods, systems, and computer readable media for managing NSSAI availability information at the NSSF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for application programming interface (API) messages that are transmitted between PLMNs.

Network slicing is used in 5G and other networks to allow network functions to provide slices of processing capacity to NF service consumers. The network slice selection function (NSSF) is the repository of network slicing information for NF service consumers. NF service consumers provide their network slicing information to the NSSF via the Nnssf_NSSAIAvailability service using an HTTP PUT or PATCH operation. The network slicing information can be accessed using the Nnssf_NSSAIAvailability service, e.g., using an HTTP GET operation. The NSSF also provides the Nnssf_NSSelection service, which enables NF service consumers to select network slices.

One problem with the Nnssf_NSSAIAvailability service and the Nnssf_NSSelection service is that the network slice information maintained by the NSSF can become stale. The network slice information provided to the NSSF using the Nnssf_NSSAIAvailability service is referred to as NSSAI availability information and contains the single NSSAIs (S-NSSAIs) per transfer area (TA) for the service consumer. If this information becomes stale or otherwise invalid, the Nnssf_NSSelection or Nnssf_NSSAIAvailability operation that relies on the stale or invalid information can fail, which may result in a network outage.

Accordingly, in light of these difficulties, there exists a need for improved methods, systems, and computer readable media for managing NSSAI availability information.

SUMMARY

A method for managing network slice selection assistance information (NSSAI) availability information includes, at a network slice selection function (NSSF), receiving NSSAI availability information from NF service consumers. The method further includes storing, for each of the NF service consumers, the NSSAI availability information in NSSAI availability information database records. The method further includes maintaining, for each of the NSSAI availability information database records, a time value usable to determine an expiration time for the record. The method further includes receiving, from the NF service consumers, requests to update the NSSAI availability information, and, in response, updating the time values for the records. The method further includes auditing the records, and, in response to failing to receive a request to update the NSSAI availability information for one of the NSSAI information database records within an expiration time, marking the record as stale. The method further includes detecting a trigger for providing NSSAI availability information in an NSSAI availability information database record to an NF service consumer, determining that the corresponding NSSAI availability information database record has been marked as stale, and, in response to determining that the record has been marked as stale, refraining from providing the NSSAI availability information in response to the trigger.

According to another aspect of the subject matter described herein, receiving the NSSAI availability information from NF service consumers includes receiving the NSSAI availability information from access and mobility management functions (AMFs).

According to another aspect of the subject matter described herein, receiving the NSSAI availability information includes receiving, from the AMFs, Nnssf_NSSAI-Availability service update request messages containing single NSSAIs (S-NSSAIs) supported by the AMFs per transfer area (TA).

According to another aspect of the subject matter described herein, communicating expiry values to the NF service consumers to indicate time intervals to the NF service consumers for updating the NSSAI availability information database records with the NSSF.

According to another aspect of the subject matter described herein, receiving the requests for updating the NSSAI availability information includes receiving Nnssf_NSSAIAvailability service update request messages containing single NSSAIs (S-NSSAIs) supported by the NF service consumers per transfer area (TA).

According to another aspect of the subject matter described herein, maintaining the time values includes storing, in each of the NSSAI availability information database records, a timestamp indicating a time when the NSSAI availability information was last updated with the NSSF.

According to another aspect of the subject matter described herein, auditing the records includes determining whether a difference between a current time and the time value for one of the records meets or exceeds an operator-configured expiry value.

According to another aspect of the subject matter described herein, detecting a trigger for providing the NSSAI availability information includes receiving a request message for Nnssf_NSSelection or Nnssf_NSSAIAvailability service.

According to another aspect of the subject matter described herein, detecting a trigger for providing the NSSAI availability information includes detecting a change in status of the NSSAI availability information to which the NF service consumer has subscribed to receive notification.

According to another aspect of the subject matter described herein, in response to determining that the record has been marked as stale, the method for managing NSSAI availability information includes sending a notification message to the NF service consumer indicating no content and/or problem details.

According to another aspect of the subject matter described herein, a system for managing network slice selection assistance information (NSSAI) availability information includes a network slice selection function (NSSF) including at least one processor and a memory. The system further includes an NSSAI availability information database stored in the memory. The system further includes an NSSAI availability information manager for receiving NSSAI availability information from NF service consumers, storing, for each of the NF service consumers, the NSSAI availability information in NSSAI availability information database records in the NSSAI availability information database, maintaining, for each of the NSSAI availability information database records, a time value usable to determine an expiration time for the record, receiving, from the NF service consumers, requests to update the NSSAI availability information, and, in response, updating the time values for the records, auditing the records, and, in response to failing to receive a request to update the NSSAI availability information for one of the NSSAI information database records within an expiration time, marking the record as stale, detecting a trigger for providing NSSAI availability information in an NSSAI availability information database record to an NF service consumer, determining that the corresponding NSSAI availability information database record has been marked as stale, and, in response to determining that the record has been marked as stale, refraining from providing the NSSAI availability information in response to the trigger.

According to another aspect of the subject matter described herein, the NSSAI availability information manager is configured to receive the NSSAI availability information from access and mobility management functions (AMFs).

According to another aspect of the subject matter described herein, in receiving the NSSAI availability information, the NSSAI availability information manager is configured to receive, from the AMFs, Nnssf_NSSAIAvailability service update request messages containing single NSSAIs (S-NSSAIs) supported by the AMFs per transfer area (TA).

According to another aspect of the subject matter described herein, the NSSAI availability information manager is configured to communicate expiry values to the NF service consumers to indicate time intervals to the NF service consumers for updating the NSSAI availability information database records with the NSSF.

According to another aspect of the subject matter described herein, the requests for updating the NSSAI availability information include Nnssf_NSSAIAvailability service update request messages containing single NSSAIs (S-NSSAIs) supported by the NF service consumers per transfer area (TA).

According to another aspect of the subject matter described herein, the NSSAI availability information manager is configured to maintain the time values by storing, in each of the NSSAI availability information database records, a timestamp indicating a time when the NSSAI availability information was last updated with the NSSF.

According to another aspect of the subject matter described herein, the NSSAI availability information manager is configured to audit the records by determining whether a difference between a current time and the time value for one of the records meets or exceeds an operator-configured expiry value.

According to another aspect of the subject matter described herein, the NSSAI availability information manager is configured to detect a trigger for providing the NSSAI availability information by receiving a request message for Nnssf_NSSelection or Nnssf_NSSAIAvailability service or detecting a change in status of the NSSAI availability information to which the NF service consumer has subscribed to receive notification.

According to another aspect of the subject matter described herein, the NSSAI availability information manager is configured to, in response to determining that the record has been marked as stale, send a notification message to the NF service consumer indicating no content and/or problem details.

According to another aspect of the subject matter described herein, A non-transitory computer readable medium having stored thereon executable instructions that when executed by a processor of a computer control the computer to perform steps is provided. The steps include receiving network slice selection assistance information (NSSAI) availability information from NF service consumers. The steps further include storing, for each of the NF service consumers, the NSSAI availability information in NSSAI availability information database records. The steps further include maintaining, for each of the NSSAI availability information database records, a time value usable to determine an expiration time for the record. The steps further include receiving, from the NF service consumers, requests to update the NSSAI availability information, and, in response, updating the time values for the records. The steps further include auditing the records, and, in response to failing to receive a request to update the NSSAI availability information for one of the NSSAI information database records within an expiration time, marking the record as stale. The steps further include detecting a trigger for providing NSSAI availability information in an NSSAI availability information database record to an NF service consumer, determining that the corresponding NSSAI availability information database record has been marked as stale, and, in response to determining that the record has been marked as stale, refraining from providing the NSSAI availability information in response to the trigger.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
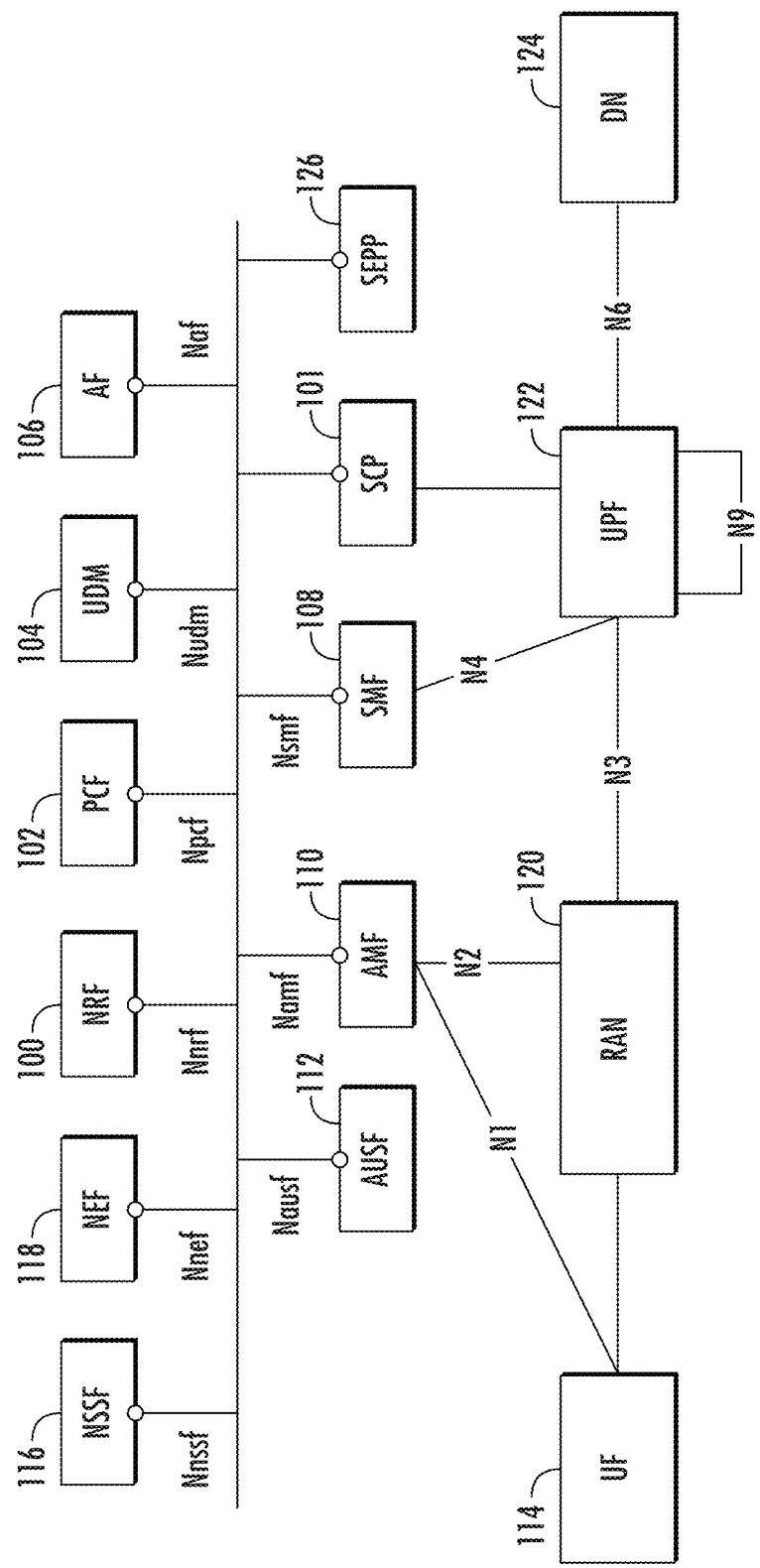
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a unified data management (UDM) 104 that manages user data, and an application function (AF) 106 that provides application services.

The NFs illustrated in FIG. 1 further include an SMF 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

As stated above, NSSF 116 provides network slicing services for devices seeking to access specific network capabilities and characteristics associated with a network slice. The two network slicing services provided by the NSSF are the Nnssf_NSSelection service and the Nnssf_NSSAIAvailability service. The Nnssf_NSSelection service is used by service consumers to select network slices. The Nnssf_NSSAIAvailability service enables NF service consumers, such as AMFs, to update S-NSSAIs that the NF service consumers support on a per TA basis and to subscribe to and notify other AMFs of any change in status, on a per TA basis, of the S-NSSAIs available per TA (unrestricted) and the restricted S-NSSAI(s) per PLMN in that TA in the serving PLMN of the UE. An S-NSSAI is a unique identifier for a network slice.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other types of networks is that NSSAI availability information can become stale, and reliance on stale NSSAI availability information can result in network outages. For example, in some network deployments, there will be multiple AMFs deployed and using the services provided by the NSSF. Each AMF sends its NSSAI availability information to the NSSF using 3GPP-defined operations. Other AMFs can access the NSSAI availability information from that NSSF through subscription.

When an NSSF goes out of service due to various reasons, such as a process crash, overload condition, database connectivity failure, or other situations where the NSSF is unable to process the incoming NSSAI availability update requests coming from the AMFs, the AMFs will identify the primary NSSF as being down. Because the primary NSSF is down, the AMFs will move to a secondary AMF to update NSSAI availability information. The AMFs will continue to update the NSSAI availability information with the secondary NSSF. Because the AMFs have moved to the secondary NSSF, the NSSAI availability information that is stored in the former primary NSSF is neither updated or removed and will be stale. If the former primary NSSF comes back into service, it could provide stale NSSAI availability information to NF service consumers. Similarly, if an AMF provides its NSSAI availability information to an NSSF, and the AMF subsequently goes out of service, then the NSSAI availability information maintained by the NSSF for the AMF will be stale.

The stale NSSAI availability information can be used for the Nnssf_NSSelection and Nnssf_NSSAIAvailability services by that NSSF without knowledge that the NSSAI availability information from a given AMF is stale. Service outages may be caused by the use of the stale data for the Nnssf_NSSelection and Nnssf_NSSAIAvailability service operations. There is no 3GPP-defined mechanism to prevent the use of stale NSSAI availability information for the Nnssf_NSSAIAvailability or Nnssf_NSSelection service operations.

According to an aspect of the subject matter described herein, it is proposed that the NSSF communicate an operator configured expiry value to AMFs in response to each initial NSSAI availability update request from a given AMF. The AMF is expected to refresh the NSSAI availability information with the NSSF at intervals that are less than the expiry time through an NSSAI availability information update request. If there is no refresh within the expiry time, the NSSF may determine that the NSSAI availability data is stale due to either the AMF moving to another NSSF or the AMF being decommissioned. Because the NSSAI availability information is marked as stale, the stale NSSAI availability information will not be considered for the Nnssf service operations.

Figure 2:
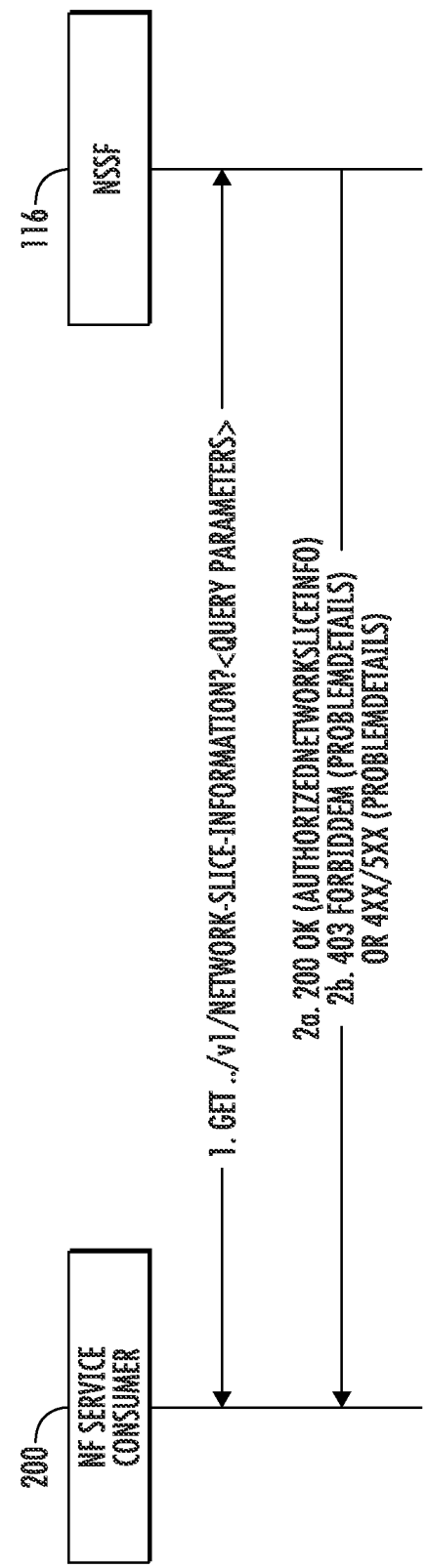
FIG. 2 is a message flow diagram illustrating exemplary messages exchanged in the Nnssf_NSSelection service operation.

The Nnssf_NSSelection service operation is defined in Section 5.2 of 3GPP TS 29.531. FIG. 2 is a message flow diagram illustrating exemplary messages exchanged in the Nnssf_NSSelection service operation. Referring to FIG. 2, in line 1, an NF service consumer 200 (e.g., an AMF or NSSF in a different PLMN) sends an HTTP GET message to NSSF 116 to retrieve information related to a network slice in the non-roaming or roaming case. The Nnssf_NSSelection service operation also enables the NSSF to provide to NF service consumer 200 the allowed NSSAI(s) and the configured NSSAI(s) for the serving PLMN.

In line 2a of the message flow diagram, if NSSF 116 has the requested network slice availability information and processing of the HTTP GET message is successful, NSSF 116 responds to the HTTP GET message with a 200 OK message containing the NSSAI availability information.

If no network slice instances can be found for the requested slice selection information or the requested slice mapping information, then NSSF 116 returns a 403 forbidden response (line 2b) with the ProblemDetails information element (IE) containing the application error "SNSSAI_NOT_SUPPORTED" (cf. Table 6.1.7.3-1 of 3GPP TS 29.531). On failure or redirection, NSSF 116 returns one of the HTTP status codes together with the response body listed in Table 6.1.3.2.3.1-3 of 3GPP TS 29.531. Because NF service consumer 200 relies on the NSSAI availability information obtained from NSSF 116, it is desirable to make sure that the NSSAI availability information provided by the Nnssf_NSSelection service is up to date.

Figure 3:
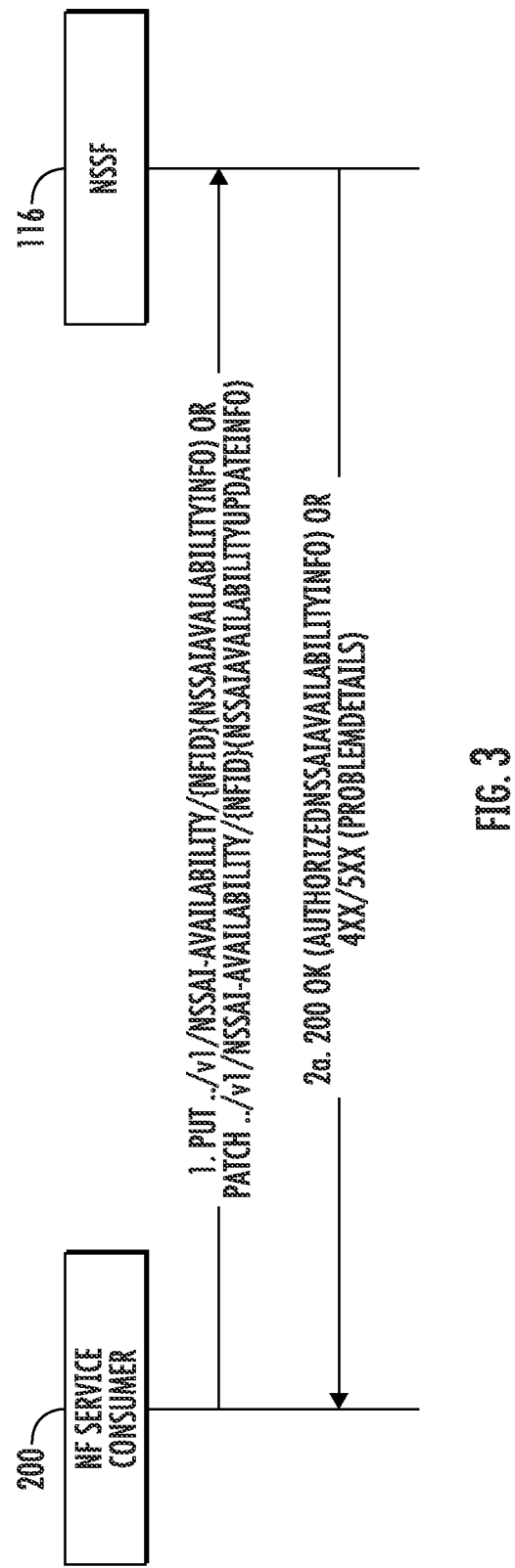
FIG. 3 is a message flow diagram illustrating exemplary messages exchanged in the update service operation of the Nnssf_NSSAIAvailability service.

The Nnssf_NSSAIAvailability service is defined in Section 5.3 of 3GPP TS 29.531. FIG. 3 is a message flow diagram illustrating exemplary messages exchanged in the Nnssf_NSSAIAvailability update service operation. The following service operations are defined for the Nnssf_NSSAIAvailability service:
    Update
    Subscribe
    Unsubscribe
    Notify
    Delete
    Options The Nnssf_NSSAIAvailability update service operation is used by the NF service consumer (e.g., an AMF) to update the S-NSSAI(s) the AMF supports on a per TA basis to the NSSF. Referring to FIG. 3, in line 1, NF service consumer 200 sends an Nnssf_NSSAIAvailability information update request message to NSSF 116. The Nnssf_NSSAIAvailability information update request may be implemented by an HTTP PUT method to provide initial NSSAI availability information to NSSF 116 or an HTTP PATCH method to update existing NSSAI availability information with NSSF 116. NSSF 116 responds as indicated in line 2 with a 200 OK message if processing of the Nnssf_NSSAIAvailability information update request is successful. If the processing of the Nnssf_NSSAIAvailability information update request is unsuccessful, NSSF 116 response with a 4xx or 5xx message including problem details. If the request for Nnssf_NSSAIAvailability service is redirected, NSSF 116 responds with a 3xx message indicating redirection.

One point to highlight is that an NF service consumer, such as an AMF, sends the NSSAI availability information to the NSSF, and the NSSF stores this data for other AMFs to use during registration and packet data unit (PDU) session establishment. NSSAI availability information is state information of the AMF that is updated by the AMF and stored with the NSSF. For the network to function properly, the NSSAI availability information should be managed, i.e., kept up to date and marked as stale if an update does not occur within an operator configurable time period.

Figure 4:
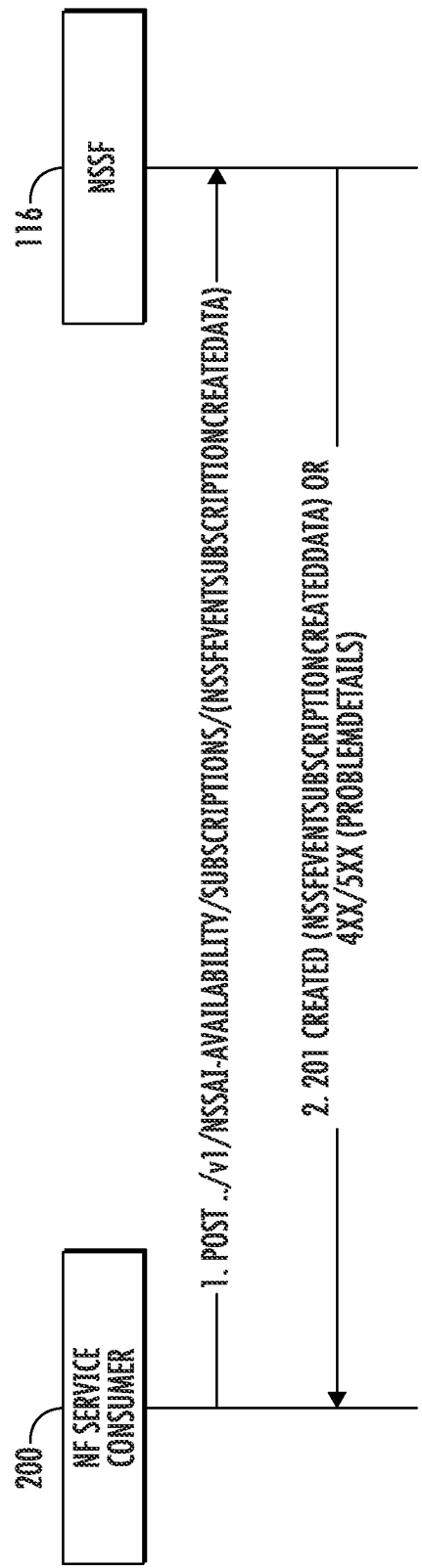
FIG. 4 is a message flow diagram illustrating exemplary messages exchanged in the subscribe service operation of the Nnssf_NSSAIAvailability service.

FIG. 4 is a message flow diagram illustrating exemplary messages exchanged in the subscribe service operation of the Nnssf_NSSAIAvailability service.

The subscribe service operation is used by an NF service consumer (e.g., an AMF) to subscribe to a notification of any changes in status of the NSSAI availability information (e.g. S-NSSAIs available per TA and the restricted S-NSSAI(s) per PLMN in that TA in the serving PLMN of the UE) when the information is updated by another AMF. Referring to the message flow in FIG. 4, in line 1, NF service consumer 200 sends an NSSAI availability information subscribe request message (implemented using an HTTP POST method) to NSSF 116. The payload body of the NSSAI availability information subscribe request contains a representation of the individual event subscription resource to be created in the NssfEventSubscriptionCreateData. The request may contain an expiry time, suggested by the NF service consumer as a hint, representing the time during which the subscription is desired to be kept active and describes the maximum duration after which the subscribed event will stop generating reports. The request may also indicate a specific AMF set to restrict the subscriptions to notifications applicable to the AMF set (i.e., notifications related to S-NSSAIs supported by the AMF set).

If creation of the subscription is successful, NSSF 116 responds in line 2 with a 200 OK message with NssfEventSubscriptionCreatedData. If creation of the subscription is not successful, NSSF 116 responds with a 4xx or 5xx message indicating problem details. If the subscription request is redirected, NSSF 116 responds with a 3xx message indicating redirection.

One point to highlight is that the subscription is for an AMF to receive updates from NSSF 116 regarding NSSAI availability information of another AMF in response to modification of the NSSAI availability information. The modification of the NSSAI availability information can be performed by the other AMF or by the operator through configuration of NSSF 116. The subject matter described herein provides a mechanism to increase the likelihood that the NSSAI availability information provided as part of a subscription NF service consumers is not stale.

Figure 5:
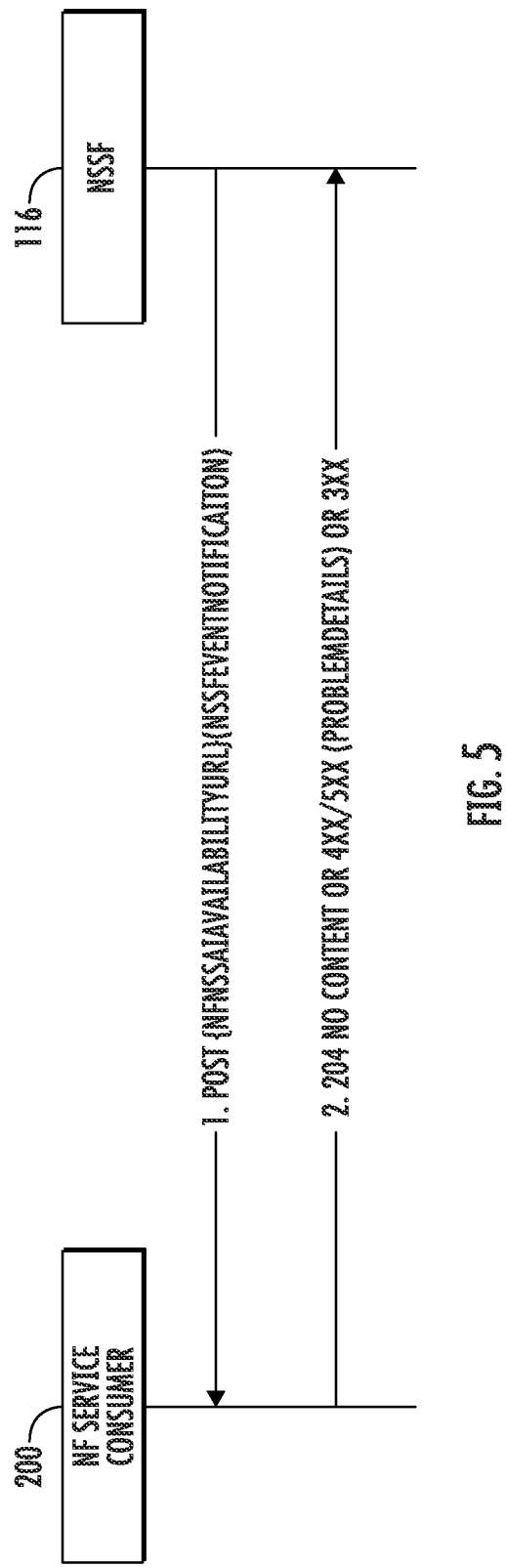
FIG. 5 is a message flow diagram illustrating exemplary messages exchanged in the notify service operation of the Nnssf_NSSAIAvailability service.

FIG. 5 is a message flow diagram illustrating exemplary messages exchanged in the notify service operation of the Nnssf_NSSAIAvailability service. The notify service operation is used by the NSSF to update the NF service consumer (e.g., an AMF) with any change in status, on a per TA basis, of the S-NSSAIs available per TA (unrestricted) and the S-NSSAIs restricted per PLMN in that TA in the serving PLMN of the UE. Referring to the message flow in FIG. 5, in line 1, NSSF 116 sends an NSSAI availability information notify request message (implemented using an HTTP POST method) to NF service consumer 200. The payload body of the POST method contains a representation of the individual NssfEventNotification resource. If there are no supported S-NSSAIs authorized by the NSSF for the TA, NSSF 116 will not return the AuthorizedNssaiAvailabilityData for the corresponding TA in the notification response. If there are no supported S-NSSAIs authorized by the NSSF for all TAs and the NF service consumer has indicated support of "EANAN" feature, NSSF 116 sets the authorizedNssaiAvailabilityData attribute to an empty array.

If the notification is triggered by the AMF that updates the supported S-NSSAIs per TA by using the update operation, NSSF 116 will not send the notification to the same AMF. As indicated in line 2, on success, 204 No Content will be returned, and the payload body of the POST response will be empty. On failure or redirection, NF service consumer 200 returns one of the HTTP status codes together with the response body listed in Table 6.2.5.2.3.1-2 of 3GPP TS 29.531.

One point to highlight is that the NSSF triggers a notification to all of the subscribed AMFs upon any NSSAI availability information update at the NSSF. This can be due to other AMFs updating NSSAI availability information or through operator configuration of the NSSF. Because this information is used by the AMFs to select network slices, it is important to take steps to ensure that the NSSAI availability information provided to the AMFs in the notify and other service operations is not stale.

Figure 6:
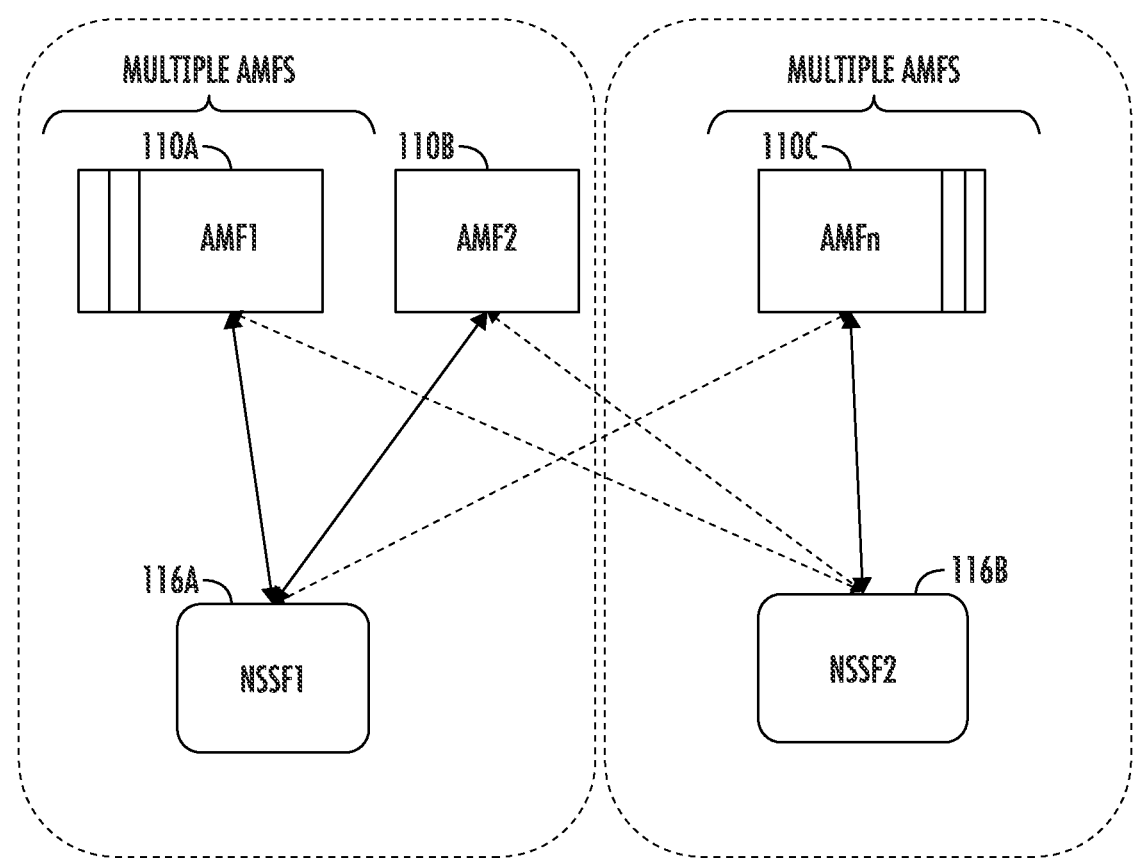
FIG. 6 is a network diagram illustrating an exemplary AMF and NSSF deployment.

FIG. 6 is a network diagram illustrating an exemplary AMF and NSSF deployment. In FIG. 6, multiple AMFs 110A and 110B are deployed and use NSSF1 116A as a primary NSSF. Similarly multiple AMFs 110C are deployed and use NSSF2 116B as the primary NSSF. Each AMF sends NSSAI availability information to the NSSF that it uses as primary. Multiple NSSFs may be deployed for high availability to cater to a large number of AMFs in the network. Upon NSSF failures, AMFs move to a secondary NSSF for all the NSSF service operations. It should be noted that NSSF1 116A and NSSF2 116B do not share any data in the example deployment.

Figure 7:
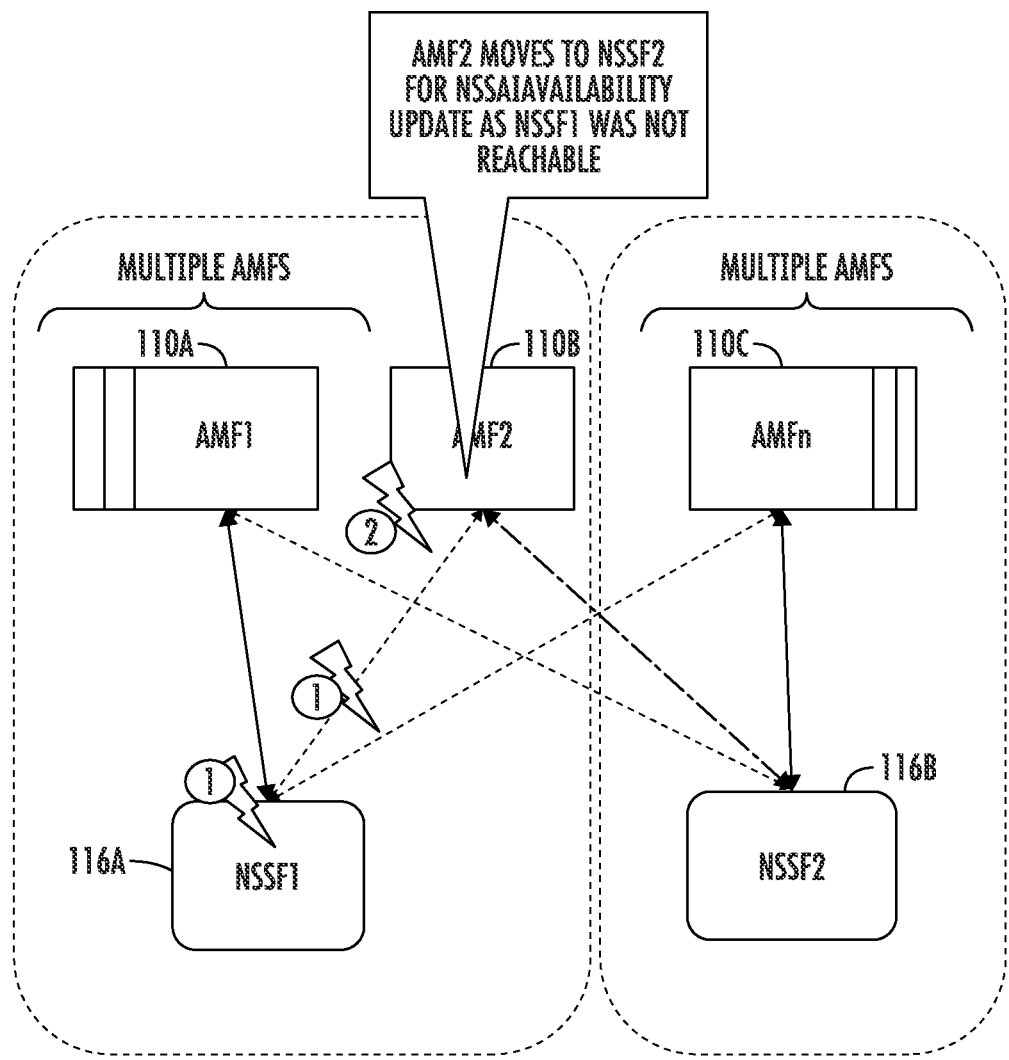
FIG. 7 is a network diagram illustrating an AMF moving from one NSSF to another NSSF with the first NSSF becomes unavailable.

There are multiple reasons for which the AMF stops updating the NSSAI availability data in a given NSSF, which will make the NSSAI availability information in that NSSF stale. Some examples are:

1. When an NSSF becomes unavailable due to various reasons, such as a process crash, overload, connectivity failure or any other similar situations, the NSSF is unable to process the incoming NSSAI availability update requests coming from the AMFs. When the AMF identifies the primary NSSF is down for a prolonged period, the AMF will move to a secondary NSSF to update its NSSAI Availability information. The AMF continues to update the NSSAI Availability information with the secondary NSSF. In FIG. 7, AMF2 110B moves to NSSF2 116B when NSSF1 116A becomes unreachable. If NSSF1 116A becomes reachable, its NSSAI availability information may be stale.

2. Another use case for the subject matter described herein occurs when an AMF is removed from the network due to the AMF being decommissioned or any scenarios where an AMF is taken out of service. In such scenarios, the NSSAI availability information for the decommissioned AMF that is stored in the NSSF is neither updated nor removed. As a result, the NSSF may provide NSSAI availability information for an AMF that is no longer in the network, which can cause a service outage.

In any of the above-described and other scenarios, the NSSF can have stale NSSAI availability information. This stale information can be used for Nnssf_NSSelection and Nssf_NSSAIAvailability services by that NSSF without knowledge that the NSSAI availability information is stale. Providing stale NSSAI availability information to other NFs can result in network service outages, e.g., when an AMF selects another AMF that is no longer available to provide service for a PDU session. There is no 3GPP-defined mechanism to identify and prevent the use of stale NSSAI availability information at NSSF.

According to one aspect of the subject matter described herein, an operator-configured expiry value may be assigned to each NSSAI availability information database record. The NSSF may audit the NSSAI availability information database records by recording a time value when an NSSAI availability information database record is created or last updated, continually checking the records to determine whether a difference between the time value for a record and the current time meets or exceeds the expiry value for the record, and, in response to determining that the difference between the time value and the current time meets or exceeds the expiry value, marking the record as stale. If a record is marked as stale, when the NSSF determines that a trigger condition for providing the NSSAI availability information in the record is met, the NSSF may refrain from providing the NSSAI availability information in response to the trigger condition being met. For example, if the NSSF receives an Nnssf_NSSelection request or Nnssf_NSSAI-Availability request or a trigger condition associated with an Nnssf_NSSAIAvailability subscription is met, the NSSF may refrain from providing the stale NSSAI availability information.

The NSSF may also communicate the expiry values to the NF service consumers when the NSSAI availability information database records are created. The NF service consumers are expected to update their NSSAI availability information database records at the NSSF using the Nnssf_NSSAIAvailability update procedure described above. On an update, the NSSF may store a new time value for the record, which effectively resets the expiration timer for the record. However, even if the NF service consumers update their NSSAI availability information with a given NSSF, this does not prevent an NSSF from which the AMFs have migrated from having stale NSSAI availability information. Having the NSSF maintain status for each NSSAI availability information database record reduces the likelihood of stale NSSAI availability information being provided in response to a trigger condition relating to the Nnssf_NSSAIAvailability or the Nnssf_NSSelection service.

Table 1 shown below illustrates an example of NSSAI availability information database records that may be maintained by the NSSF.

TABLE 1

NSSAI Availability Information Database Records

| NSSAI Availability Info | Time Value (Timestamp) | Status (active or stale) |
| --- | --- | --- |
| NSSAI data1 | timestamp1 | active |
| NSSAI data2 | timestamp2 | active |
| NSSAI dataN | timestampN | stale |

In Table 1, each NSSAI availability information database record includes a time value and a status indicator that indicates whether the record is active or stale. The NSSF may also include configured expiry values for each NF service consumer. Table 2 shown below illustrates an example of expiry values that may be maintained for each NF service consumer.

TABLE 2

Expiry Values Configured for NF Service Consumers

| NF Service Consumer ID (AMF ID) | Expiry Value | Flag (Value = True/False) |
| --- | --- | --- |
| AMF1 | Value1 | True |
| AMF2 | Value2 | True |
| AMFN | ValueN | False |

An operator configuration may be defined at the NSSF for each AMF. The operator is able to configure all the AMFs in the network which are handled by that NSSF. The expiry value for a given AMF is used to set the expiry time period of the NSSAI availability data that was received from that AMF. A flag may also be configured to activate this feature for a given AMF. There could be instances where AMFs do not implement the NSSAI availability information management feature. For such instances, the value of the flag field may be set to false to disable the feature. In one example, the operator may configure an individual (and possibly different) expiry value for each AMF. In an alternate example, the operator may configured a global expiry value that is the same for all AMFs that support the NSSAI availability management feature.

Figure 8:
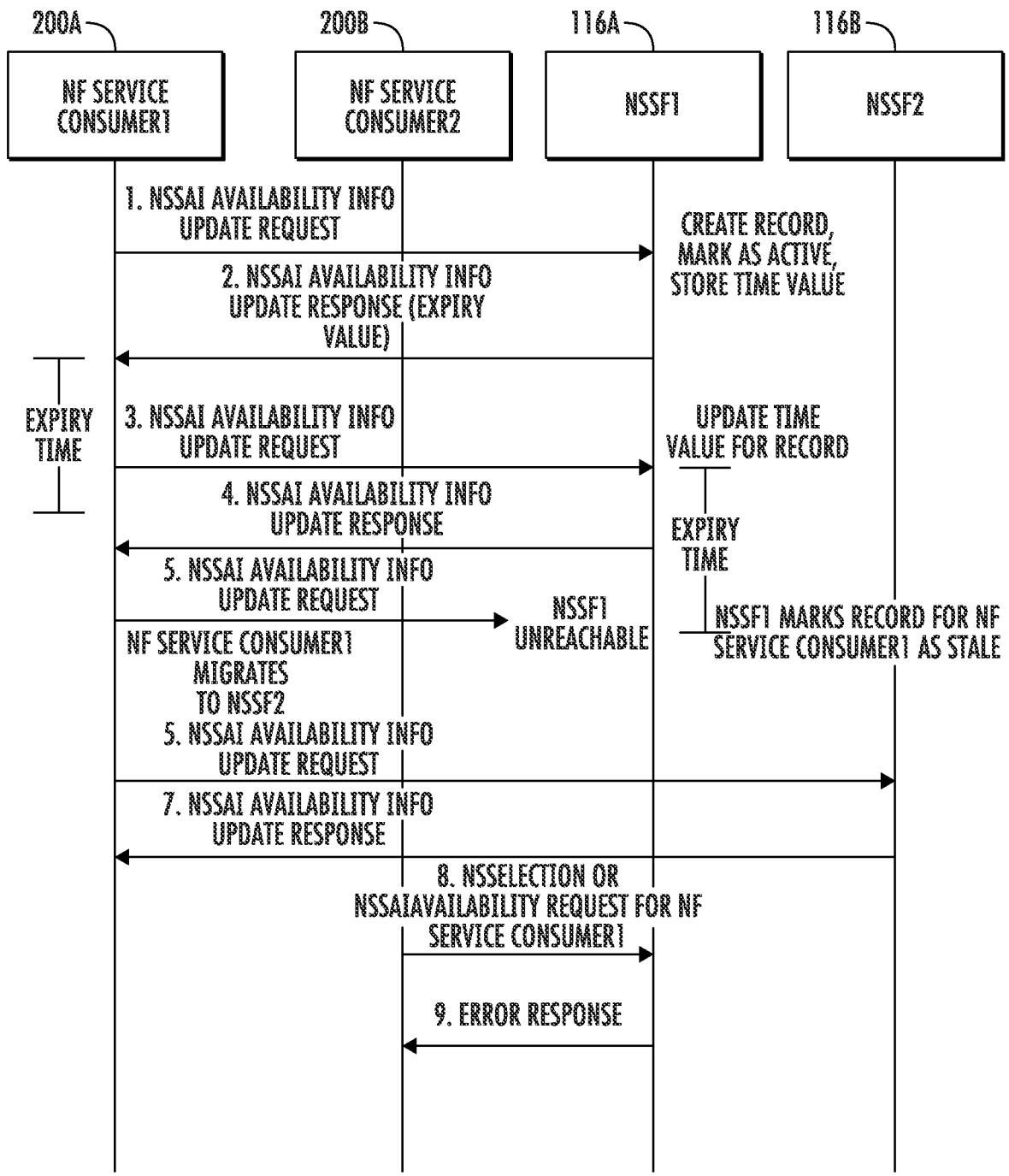
FIG. 8 is a message flow diagram illustrating exemplary messages exchanged when the NSSF manages NSSAI availability information and refrains from providing stale information to a requesting NF service consumer.

FIG. 8 is a message flow diagram illustrating exemplary messages exchanged when the NSSF manages NSSAI availability information and refrains from providing stale information to a requesting NF service consumer. Referring to FIG. 8, in line 1, NF service consumer1 200A sends and NSSAI availability information update request to NSSF1 116A. It is assumed that the update request is an initial request. NSSF1 116A receives the request, creates a record in the NSSAI availability information database, and stores the NSSAI availability information for NF service consumer1 200A in the database record. NSSF1 116A also stores a time value for the record, which NSSF1 116A uses to determine whether the NSSAI availability information in the record has become stale.

In line 2, NSSF1 116A responds with an NSSAI availability information response indicating that the database record was successfully created. The response may also include the operator configured expiry value as illustrated above in Table 2, which NF service consumer 200A will use to determine how often to update or refresh the NSSAI availability information database record with NSSF 116A.

In line 3, NF service consumer 200A sends an NSSAI availability information update request to NSSF1 116A to update and/or refresh the timer of the NSSAI availability information maintained by NSSF1 116A. In this example, it is assumed that NSSF1 116A receives the NSSAI availability information update request within the time interval defined by the expiry time for the record. Accordingly, NSSF1 116A updates the time value for the record with a timestamp indicating the time of receipt of the NSSAI availability information update request message in line 3, the record remains active, and NSSF1 116A responds in line 4 with an NSSAI availability information update response indicating successful updating of the record.

In line 5, NF service consumer 200A sends an NSSAI availability information update request to NSSF1 116A, but NSSF1 116A is unreachable or otherwise unavailable. Accordingly, NF service consumer1 200A migrates to NSSF2 116B and sends an NSSAI availability information update request to NSSF2 116B (line 6). In line 7, NSSF2 116B responds with an NSSF availability information update response indicating that the NSSAI availability information database record was successfully created. The response may include an expiry value if NSSF2 116B supports the NSSAI availability information management feature.

NSSF1 116A continually audits its NSSAI availability information database records to determine whether any of the records have expired. In this example, its is assumed that NSSF1 116A determines that the NSSAI availability information database record for NF service consumer1 200A has expired, because NSSF1 116A did not receive an NSSAI availability information update request within the expiration interval defined for the record. Accordingly, NSSF1 116A changes the status of the NSSAI availability information database record for NF service consumer1 200A to stale.

In line 8, after NSSF1 116A becomes available or reachable, NF service consumer 200B sends a Nnssf_NSSelection or Nnssf_NSSAIAvailability information request to NSSF1 116A requesting NSSAI availability information for NF service consumer 200A. NSSF1 116A receives the request, locates the corresponding NSSAI availability information database record, and determines that the record is stale. Accordingly NSSF1 200A refrains from providing the NSSAI availability information to NF service consumer2 200B and responds with an error message (line 9).

Figure 9:
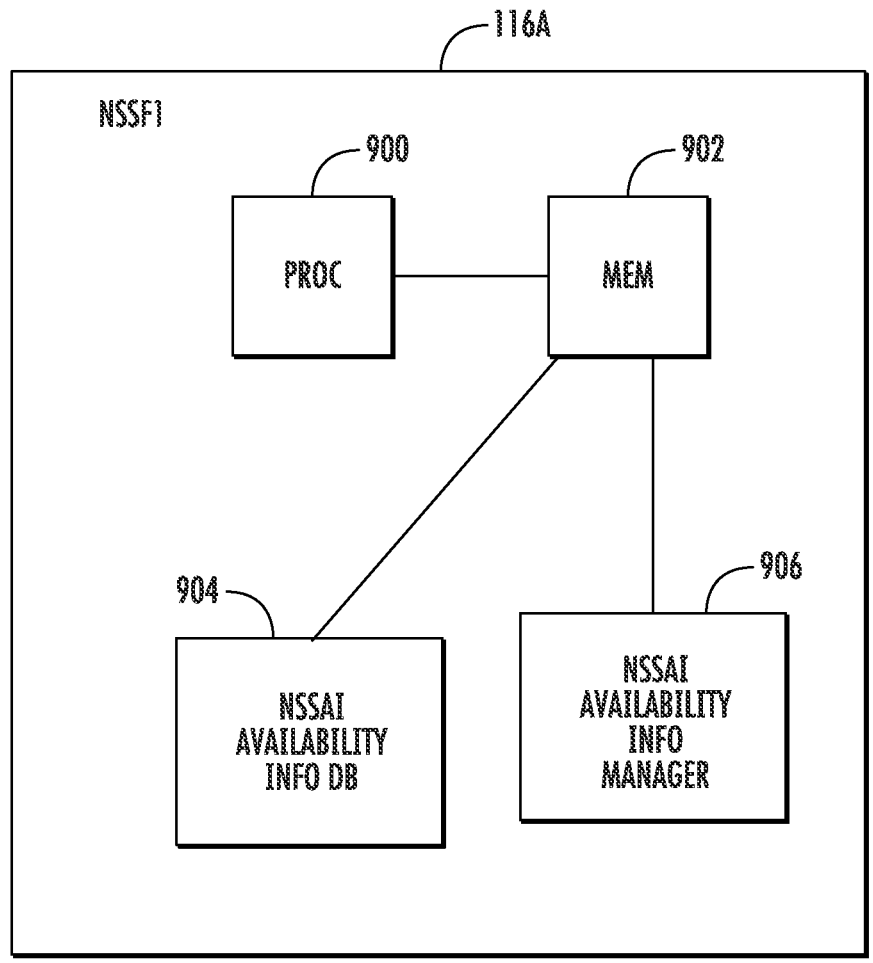
FIG. 9 is a block diagram illustrating an exemplary architecture for an NSSF that manages NSSAI availability information.

FIG. 9 is a block diagram illustrating an exemplary architecture for an NSSF that manages NSSAI availability information. Referring to FIG. 9, NSSF1 200A includes at least one processor 900 and memory 902. NSSF1 200A includes an NSSAI availability information database 904 stored in memory 902. NSSAI availability information database 904 may include NSSAI availability information database records containing NSSAI availability information of NF service consumers. NSSAI availability information database 904 may also include time values (see Table 1) and expiry values (see Table 2) used by NSSF1 200A to audit the NSSAI availability information database records. NF service consumer 200A further includes an NSSAI availability information manager 906 for performing the steps described herein for NSSAI availability information management, including creating and updating records in database 904, auditing the records in database 904, and responding to requests for Nnssf_NSSAIAvailability and Nnssf_NSSelection service. NSSAI availability information manager 906 may be implemented using computer executable instructions stored in memory 902 and executable by processor 900.

Figure 10:
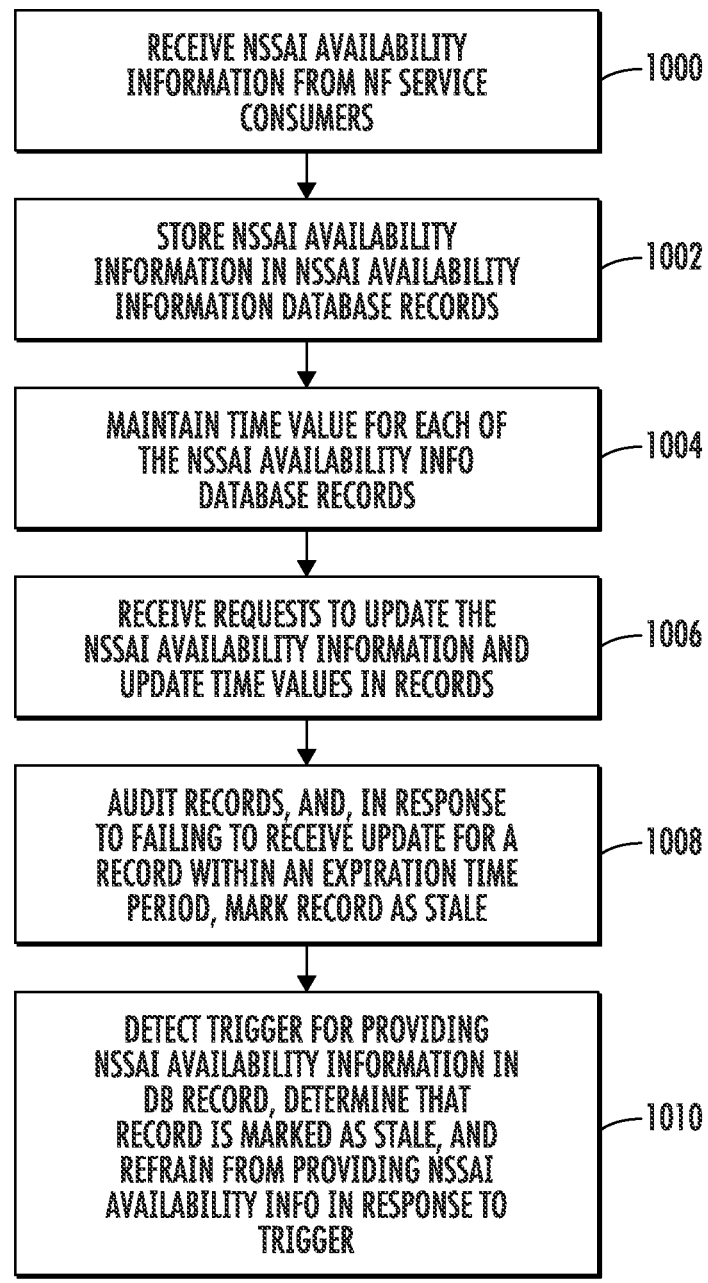
FIG. 10 is a flow chart illustrating an exemplary process for managing NSSAI availability information.

FIG. 10 is a flow chart illustrating an exemplary process for managing NSSAI availability information. Referring to FIG. 10, in step 1000, the process includes receiving NSSAI availability information from NF service consumers. For example, NSSF 116A may receive NSSAI availability information from AMFs in Nnssf_NSSAIAvailability update request messages.

In step 1002, the process includes storing, for each of the NF service consumers, the NSSAI availability information in an NSSAI availability information database record. For example, NSSF 116A may create NSSAI availability information database records in response to received Nnssf_NSSAIAvailability update request messages and store the NSSAI availability information from the messages in the records.

In step 1004, the process includes maintaining, for each of the NSSAI availability information database records, a time value usable to determine an expiration time for the record. For example, NSSF 116A may store a timestamp for each NSSAI availability information database record where the timestamp indicates the time that the record was last updated.

In step 1006, the process includes receiving, from the NF service consumers, requests to update the NSSAI availability information, and, in response, updating the time values in the records. For example, NSSF 116A may update the timestamps in the NSSAI availability information database records each time an NSSAI availability information update request is received from an AMF.

In step 1008, the process includes auditing the records, and, in response to failing to receive a request to update the NSSAI availability information within an expiration time, marking the record as stale. For example, NSSF 116A may continually audit the NSSAI availability information database records to determine whether each record is expired by determining whether a difference between the current time and the time value maintained for the record meets or exceeds an expiry time configured for the record. If the difference between the current time and the time value for the record meets or exceeds the expiry time, NSSF 116A may mark the record as stale. If the difference between the current time and the time value for the record does not meet or exceed the expiry time, NSSF 116A may allow the record to remain active and continue auditing the records.

In step 1010, the process includes detecting a trigger for providing NSSAI availability information to an NF service consumer in an NSSAI availability information database record, determining that the corresponding NSSAI availability information database record has been marked as stale, and, in response to determining that the record has been marked as stale, refraining from providing the NSSAI availability information in response to the trigger. For example, NSSF 116A may receive a request for Nnssf_NSSAIAvailability or Nnssf_NSSelection service, use query parameters from the request to perform a lookup in the NSSAI availability information database, locate the corresponding record, and determine whether the record is marked as stale. The query parameters from the record used to perform the lookup in the database may include the S-NSSAI. If the record is marked as stale, NSSF 116A may refrain from providing the NSSAI availability information to the requesting NF service consumer and send an error message to the NF service consumer.

Another example of a trigger condition that may cause NSSF 116A to access a record in the NSSAI availability information database is the satisfaction of a condition associated with a subscription created using the Nnssf_NSSAI-Availability service. If a condition associated with a subscription is satisfied, NSSF 116A may determine whether the corresponding NSSAI availability information database record is active. If the record is active, NSSF 116A may provide the NSSAI availability information to the subscribing NF service consumer. If the record is stale, NSSF 116A may refrain from providing the NSSAI availability information to the subscribing NF service consumer.

Exemplary advantages of the subject matter described herein include the ability for the NSSF to determine the whether NSSAI availability information that was updated from the AMFs and to use the staleness status of NSSAI availability information database records to determine whether to provide the information in response to trigger conditions relating to the Nnssf_NSSAIAvailability and Nnssf_NSSelection services. Using the methodology described herein, service outage scenarios caused by stale NSSAI availability data will be reduced. The solution described herein is fully backward compatible with 3GPP-defined service operations. The subject matter described herein provides additional fault tolerance 5G and other networks.

The disclosure of each of the following references is hereby incorporated herein by reference in its entirety.

REFERENCES 1. 3$^{rd}$ Generation Partnership Project; Technical Specification Group Core Network and Terminals; 5G System; Network Slice Selection Services; Stage 3 (Release 17) 3GPP TS 29.531 V17.4.0 (2022-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for managing network slice selection assistance information (NSSAI) availability information, the method comprising:
    at a network slice selection function (NSSF):
        receiving NSSAI availability information from NF service consumers;
        storing, for each of the NF service consumers, the NSSAI availability information in NSSAI availability information database records;
        maintaining, for each of the NSSAI availability information database records, a time value usable to determine an expiration time for the record;
        receiving, from the NF service consumers, requests to update the NSSAI availability information, and, in response, updating the time values for the records;
        auditing the records, and, in response to failing to receive a request to update the NSSAI availability information for one of the NSSAI information database records within an expiration time, marking the record as stale; and
        detecting a trigger for providing NSSAI availability information in an NSSAI availability information database record to an NF service consumer, determining that the corresponding NSSAI availability information database record has been marked as stale, and, in response to determining that the record has been marked as stale, refraining from providing the NSSAI availability information in response to the trigger.

2. The method of claim 1 wherein receiving the NSSAI availability information from NF service consumers includes receiving the NSSAI availability information from access and mobility management functions (AMFs).

3. The method of claim 2 wherein receiving the NSSAI availability information includes receiving, from the AMFs, Nnssf_NSSAIAvailability service update request messages containing single NSSAIs (S-NSSAIs) supported by the AMFs per transfer area (TA).

4. The method of claim 1 comprising communicating expiry values to the NF service consumers to indicate time intervals to the NF service consumers for updating the NSSAI availability information database records with the NSSF.

5. The method of claim 1 wherein receiving the requests for updating the NSSAI availability information includes receiving Nnssf_NSSAIAvailability service update request messages containing single NSSAIs (S-NSSAIs) supported by the NF service consumers per transfer area (TA).

6. The method of claim 1 wherein maintaining the time values includes storing, in each of the NSSAI availability information database records, a timestamp indicating a time when the NSSAI availability information was last updated with the NSSF.

7. The method of claim 1 wherein auditing the records includes determining whether a difference between a current time and the time value for one of the records meets or exceeds an operator-configured expiry value.

8. The method of claim 1 wherein detecting a trigger for providing the NSSAI availability information includes receiving a request message for Nnssf_NSSelection or Nnssf_NSSAIAvailability service.

9. The method of claim 1 wherein detecting a trigger for providing the NSSAI availability information includes detecting a change in status of the NSSAI availability information to which the NF service consumer has subscribed to receive notification.

10. The method of claim 1 comprising, in response to determining that the record has been marked as stale, sending a notification message to the NF service consumer indicating no content and/or problem details.

11. A system for managing network slice selection assistance information (NSSAI) availability information, the system comprising:
    a network slice selection function (NSSF) including at least one processor and a memory;
    an NSSAI availability information database stored in the memory; and
    an NSSAI availability information manager for receiving NSSAI availability information from NF service consumers, storing, for each of the NF service consumers, the NSSAI availability information in NSSAI availability information database records in the NSSAI availability information database, maintaining, for each of the NSSAI availability information database records, a time value usable to determine an expiration time for the record, receiving, from the NF service consumers, requests to update the NSSAI availability information, and, in response, updating the time values for the records, auditing the records, and, in response to failing to receive a request to update the NSSAI availability information for one of the NSSAI information database records within an expiration time, marking the record as stale, detecting a trigger for providing NSSAI availability information in an NSSAI availability information database record to an NF service consumer, determining that the corresponding NSSAI availability information database record has been marked as stale, and, in response to determining that the record has been marked as stale, refraining from providing the NSSAI availability information in response to the trigger.

12. The system of claim 11 wherein the NSSAI availability information manager is configured to receive the NSSAI availability information from access and mobility management functions (AMFs).

13. The system of claim 12 wherein, in receiving the NSSAI availability information, the NSSAI availability information manager is configured to receive, from the AMFs, Nnssf_NSSAIAvailability service update request messages containing single NSSAIs (S-NSSAIs) supported by the AMFs per transfer area (TA).

14. The system of claim 11 wherein the NSSAI availability information manager is configured to communicate expiry values to the NF service consumers to indicate time intervals to the NF service consumers for updating the NSSAI availability information database records with the NSSF.

15. The system of claim 11 wherein the requests for updating the NSSAI availability information include Nnssf_NSSAIAvailability service update request messages containing single NSSAIs (S-NSSAIs) supported by the NF service consumers per transfer area (TA).

16. The system of claim 11 wherein the NSSAI availability information manager is configured to maintain the time values by storing, in each of the NSSAI availability information database records, a timestamp indicating a time when the NSSAI availability information was last updated with the NSSF.

17. The system of claim 11 wherein the NSSAI availability information manager is configured to audit the records by determining whether a difference between a current time and the time value for one of the records meets or exceeds an operator-configured expiry value.

18. The system of claim 11 wherein the NSSAI availability information manager is configured to detect a trigger for providing the NSSAI availability information by receiving a request message for Nnssf_NSSelection or Nnssf_NSSAI-Availability service or detecting a change in status of the NSSAI availability information to which the NF service consumer has subscribed to receive notification.

19. The system of claim 11 wherein the NSSAI availability information manager is configured to, in response to determining that the record has been marked as stale, send a notification message to the NF service consumer indicating no content and/or problem details.

20. A non-transitory computer readable medium having stored thereon executable instructions that when executed by a processor of a computer control the computer to perform steps comprising:
receiving network slice selection assistance information (NSSAI) availability information from NF service consumers;
storing, for each of the NF service consumers, the NSSAI availability information in NSSAI availability information database records;
maintaining, for each of the NSSAI availability information database records, a time value usable to determine an expiration time for the record;
receiving, from the NF service consumers, requests to update the NSSAI availability information, and, in response, updating the time values for the records;
auditing the records, and, in response to failing to receive a request to update the NSSAI availability information for one of the NSSAI information database records within an expiration time, marking the record as stale; and
detecting a trigger for providing NSSAI availability information in an NSSAI availability information database record to an NF service consumer, determining that the corresponding NSSAI availability information database record has been marked as stale, and, in response to determining that the record has been marked as stale, refraining from providing the NSSAI availability information in response to the trigger.

* * * * *

UNITED STATES PATENT AND TRADEMARK OFFICE
CERTIFICATE OF CORRECTION

PATENT NO. : 12,156,128 B2  
APPLICATION NO. : 17/853130  
DATED : November 26, 2024  
INVENTOR(S) : Jayaramachar et al.

Page 1 of 1

It is certified that error appears in the above-identified patent and that said Letters Patent is hereby corrected as shown below:

On the Title Page

Column 1, under Title, Line 6, delete "ELECTION" and insert -- SELECTION --, therefor.

In the Drawings

On sheet 2 of 10, in FIG. 2, Line 2, delete "FORBIDDEM" and insert -- FORBIDDEN --, therefor.

On sheet 5 of 10, in FIG. 5, Line 4, delete "(NSSFEVENTNOTIFICAITON)" and insert -- (NSSFEVENTNOTIFICATION) --, therefor.

In the Specification

In Column 1, under Title, Line 6, delete "ELECTION" and insert -- SELECTION --, therefor.

In Column 13, Line 7, delete "its is" and insert -- it is --, therefor.

In Column 15, Line 8, delete "(2022-03)" and insert -- (2022-03). --, therefor.

Signed and Sealed this  
Thirteenth Day of May, 2025

Coke Morgan Stewart  
*Acting Director of the United States Patent and Trademark Office*